United States Patent Office 3,502,255
Patented Mar. 24, 1970

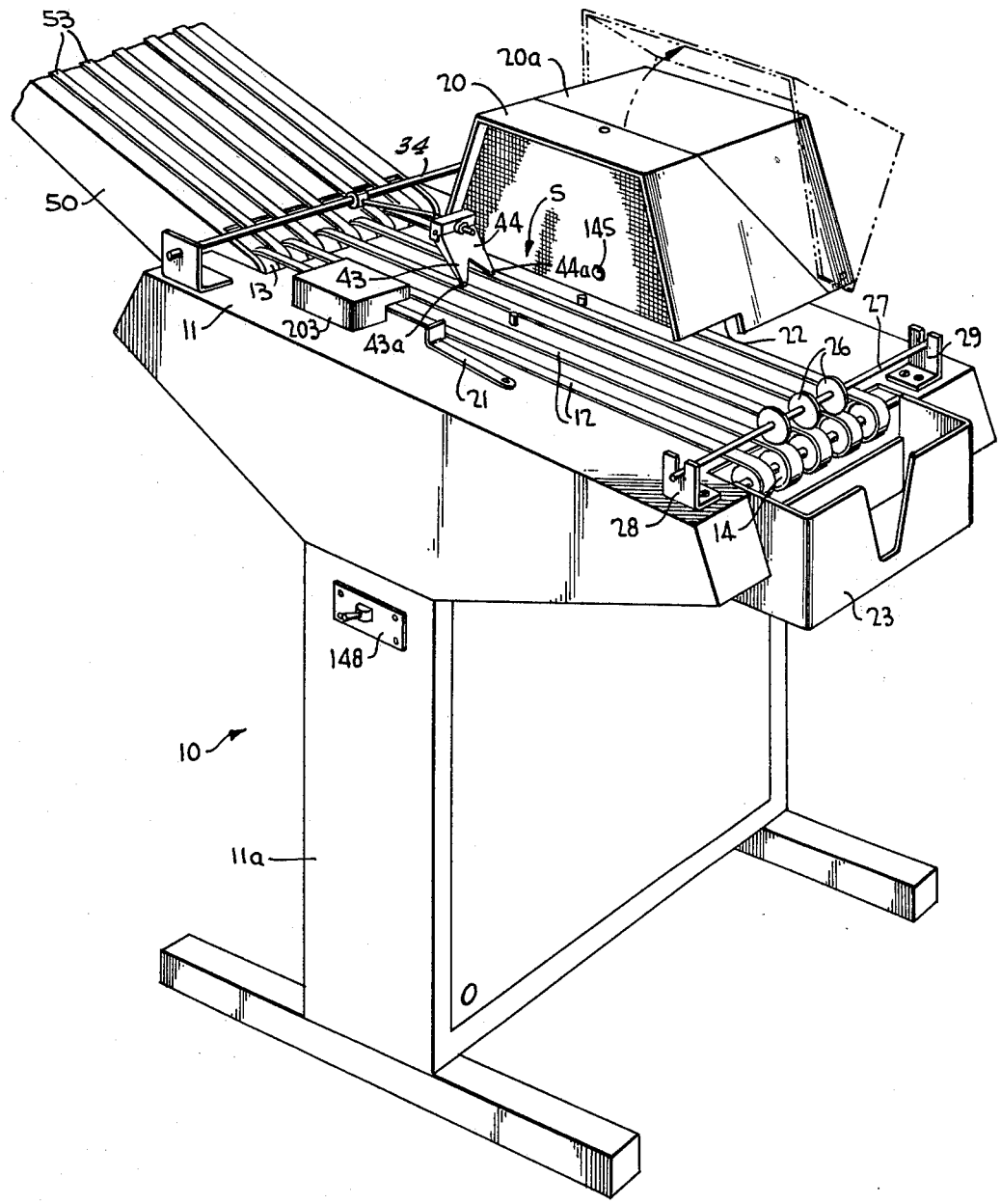

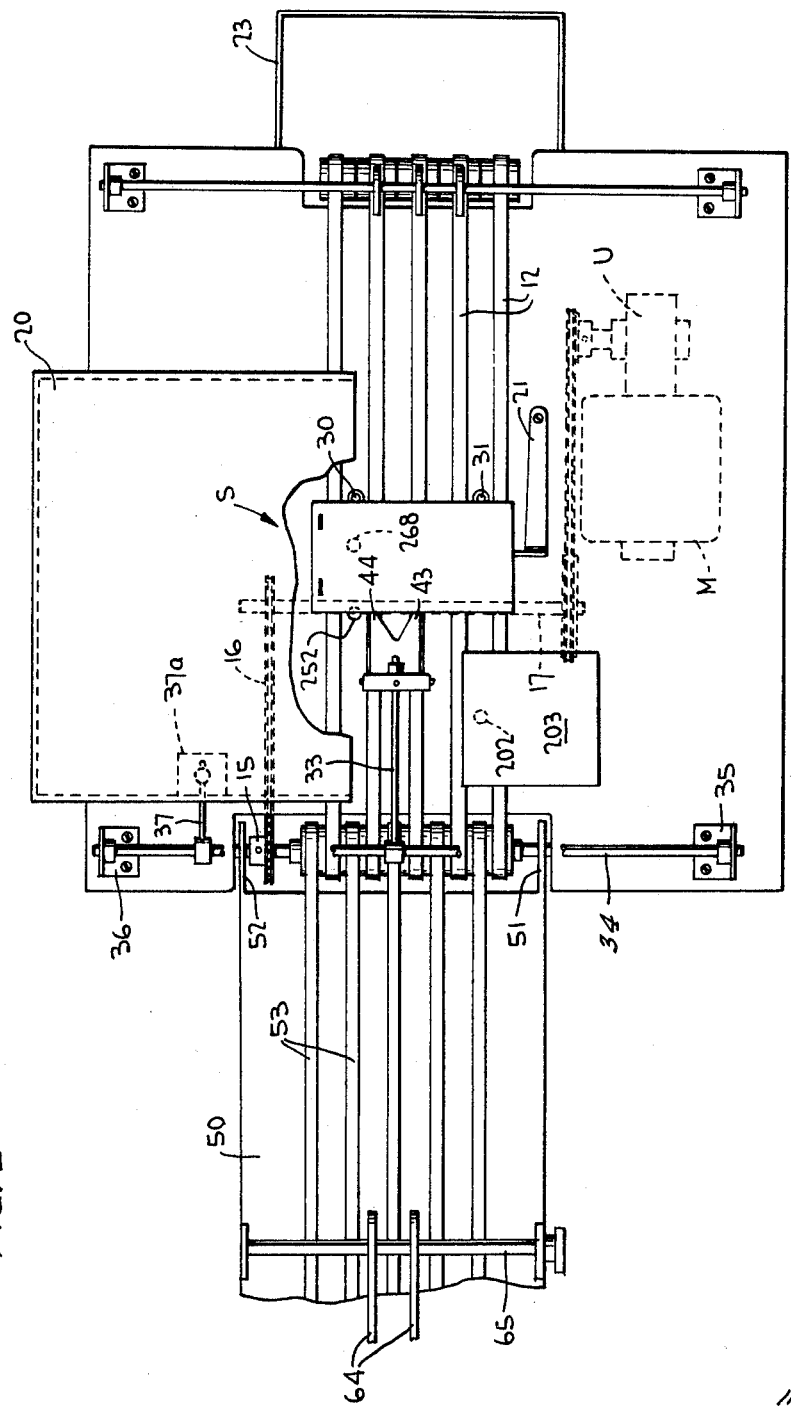

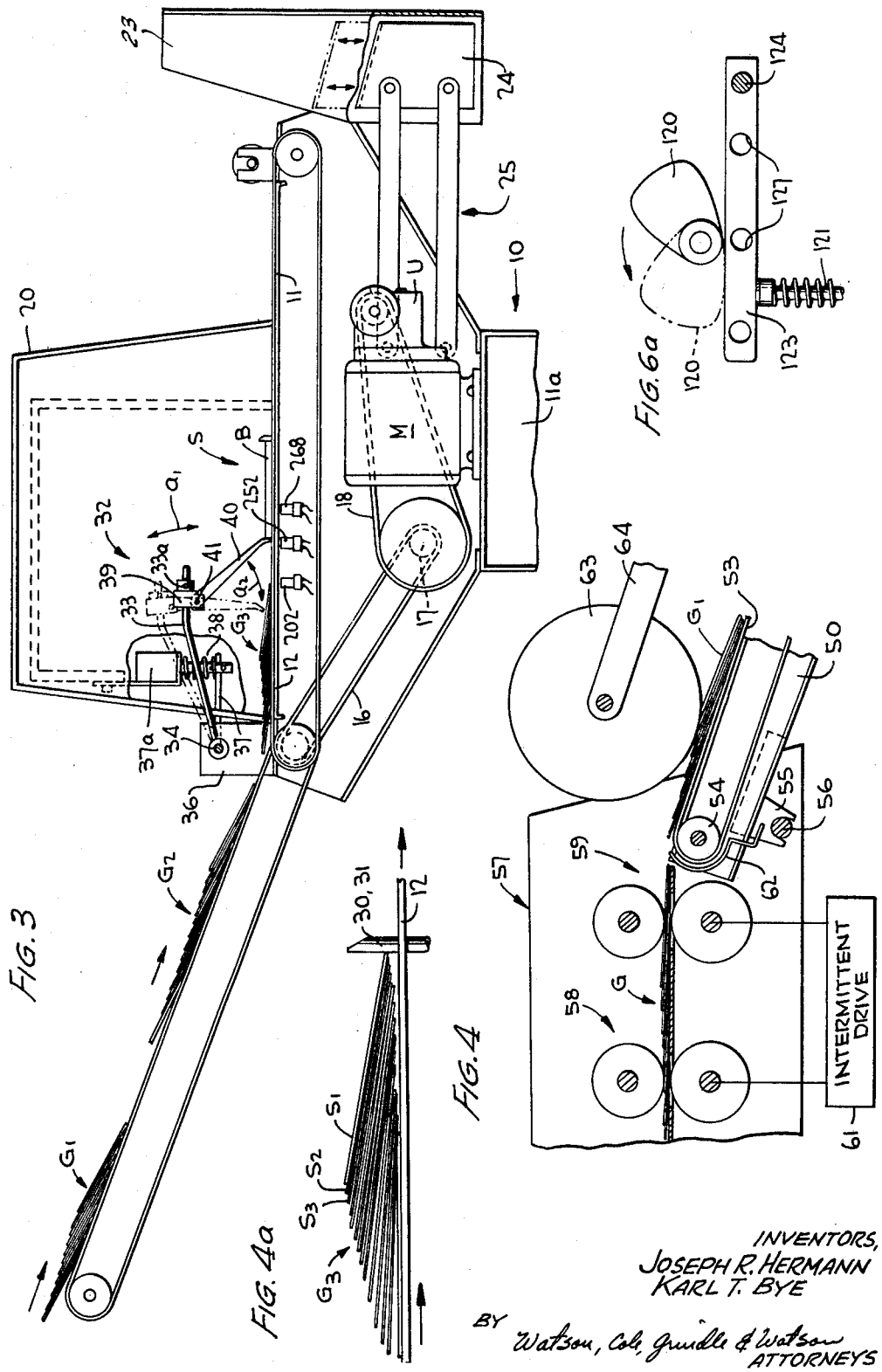

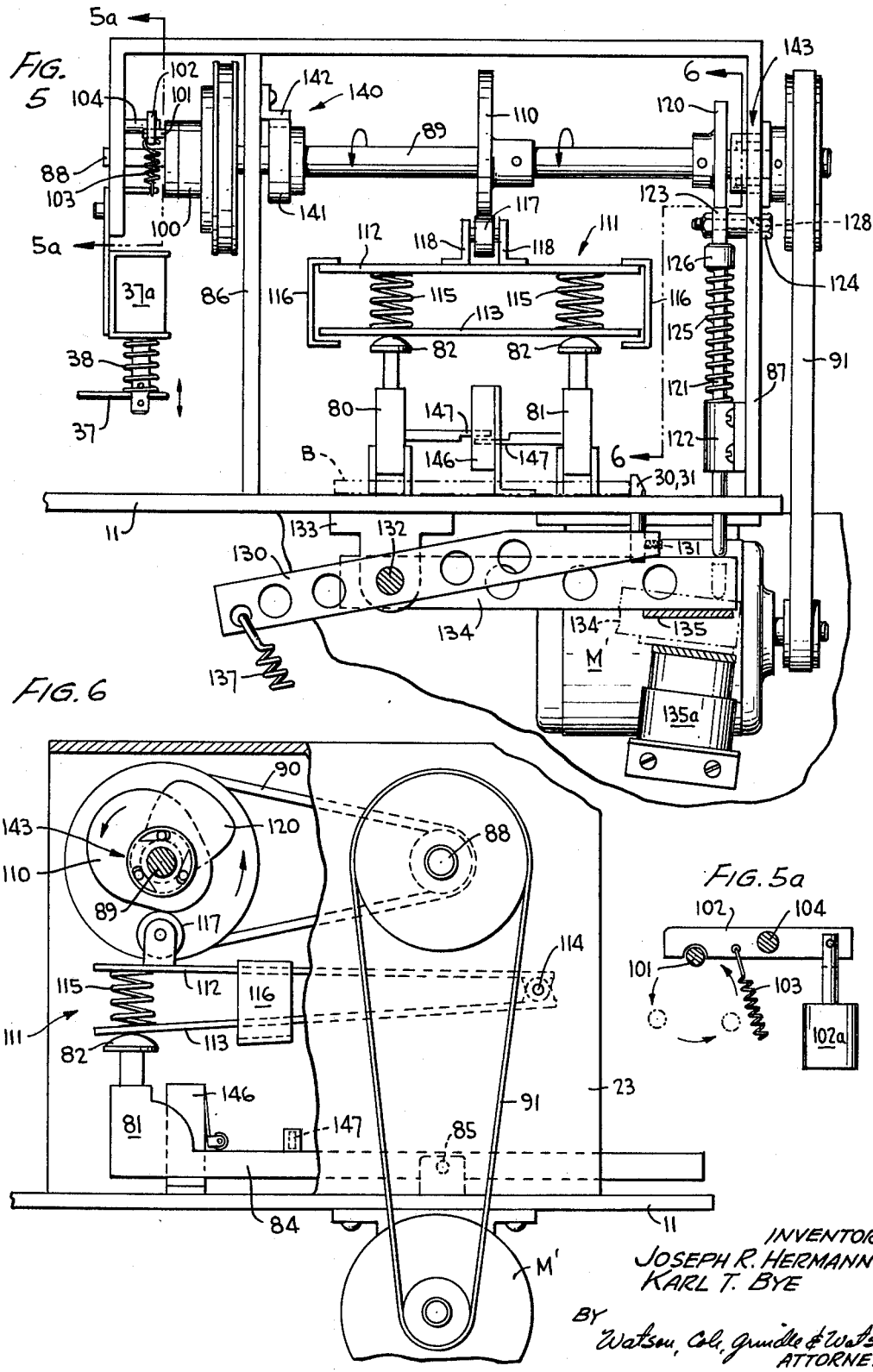

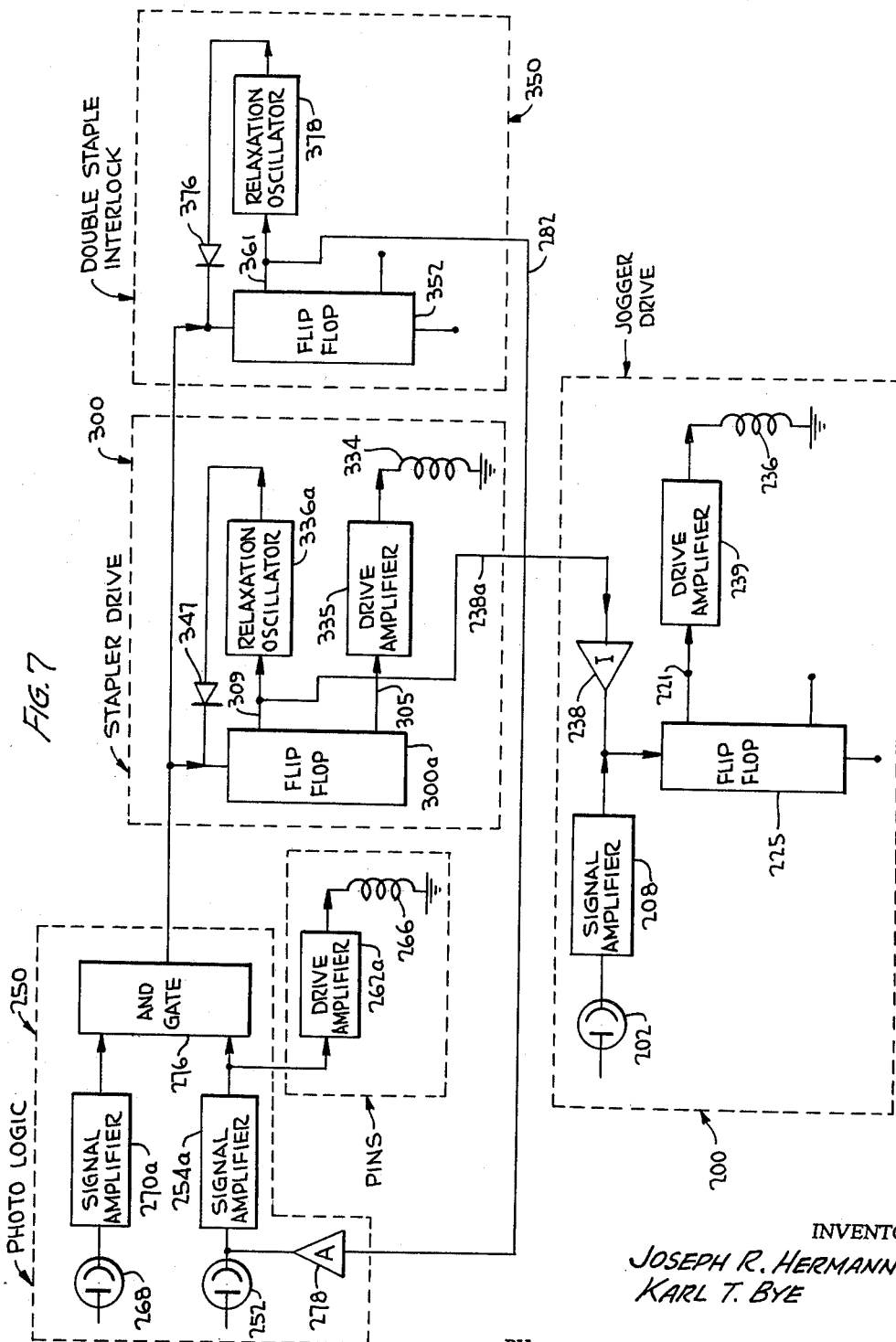

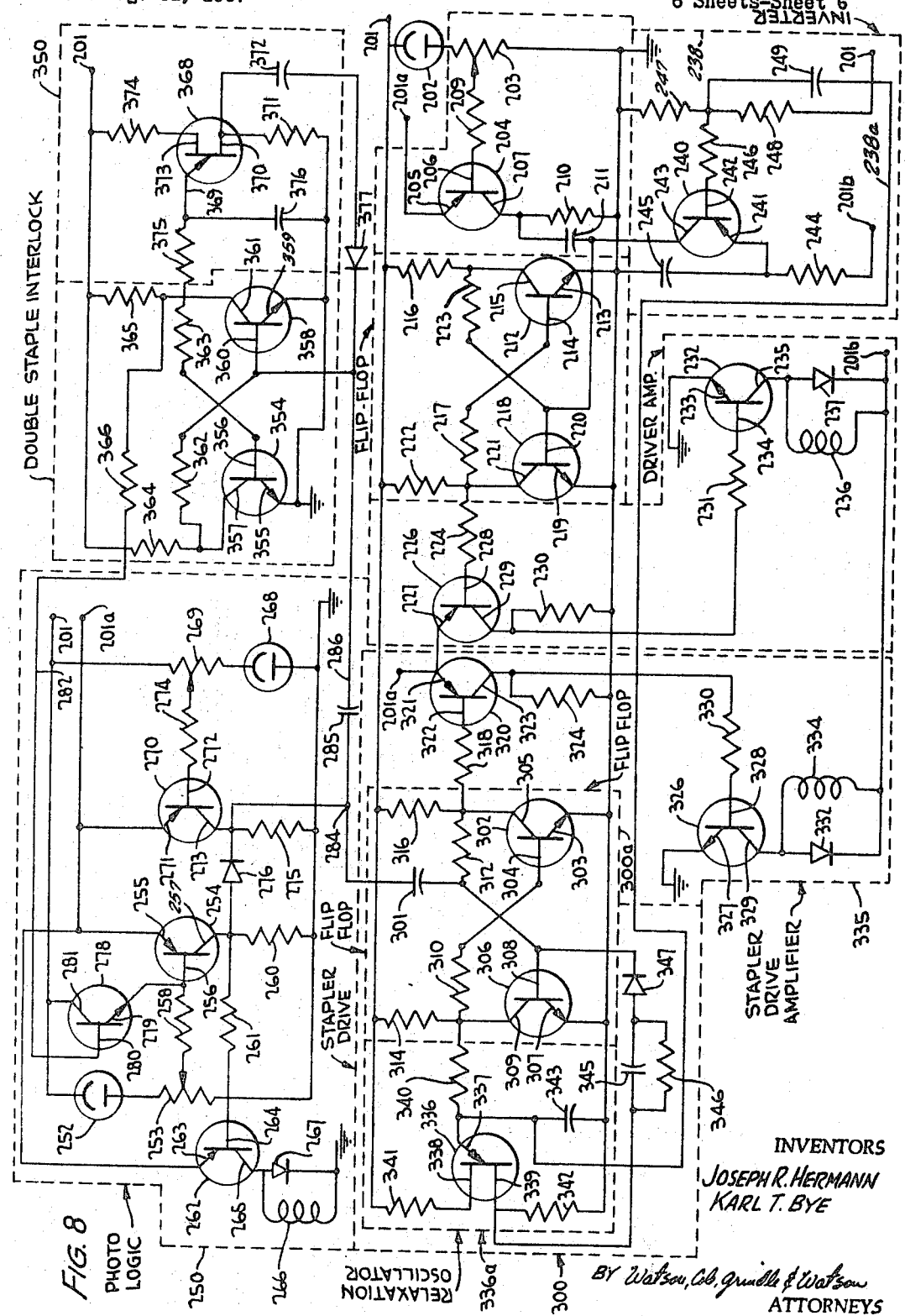

3,502,255
STAPLING MACHINE
Joseph R. Hermann, Kenmore, N.Y., and Karl T. Bye, Dover, N.H., assignors to Moore Business Forms, Inc., Niagara Falls, N.Y., a corporation of Delaware
Filed Aug. 31, 1967, Ser. No. 664,663
Int. Cl. B27f 7/08
U.S. Cl. 227—3                                    16 Claims

ABSTRACT OF THE DISCLOSURE

A high speed stapling arrangement for operating on collated material fed by an endless conveyor and jogged against stop means at a stapling station. An overhead jogger which cooperates with said conveyor urges the last sheets of the collated material against the stops with progressively decreasing force with the actuation of the stapler and stop means being by means of rotating cams. In-line photocells with attendant high speed circuitry insures proper sequential operation of the stop means, jogger, and stapler and the sheets are handled in reversely shingled form to allow rapid transport and efficient jogging action against the stop means.

---

The present invention relates to stapling machines and methods and, more particularly, to a machine and related method for high speed stapling of collated material, such as coupon books and pamphlets.

With the advent of the increased popularity of monthly premium payment plans and credit arrangements, more and more companies, such as insurance companies, are offering their customers this convenience. To facilitate the bookkeeping operation, each company has found it necessary to supply the customer with small coupon books or the like, a page of which is removed and used to accompany each check for identification. Heretofore, automatic stapling machines of which we are aware have been relatively slow in terms of overall operating speed including collecting, jogging, stapling and delivery operations so that their use on these low cost, high volume coupon books has not been economically feasible. Also, these prior art machines are usually mechanically designed for larger size books and pamphlets, and, as a result, the maximum efficiency in terms of speed and accuracy on smaller book material leaves still more to be desired. As a result of these economic considerations and factors, small books of the type described prior to the present invention, have been stapled or fastened together for the most part by simple, low cost machines that are not only primarily designed for another purpose, but which in most cases, require at some point manual operation to further slow down the operation and add further to the cost.

Accordingly, it is one object of the present invention to provide an accurate, high speed stapling machine and method which is particularly adapted for use with small coupon books or other similar collated material.

It is another object of the present invention to provide such an arrangement that is completely automatic and capable of high speed operation for stapling of a large number of books in a minimum amount of time and without the need for any manual operation.

It is another object of the present invention to provide an automatic stapling machine and method wherein groups of collated sheets are sequentially presented in shingled form by an endless conveyor to a stapling machine, and the sheets arrested at the stapling station and jogged into alignment against a stop; the stapling operation being thereafter effected whereupon the completed book is allowed to proceed on the conveyor to a final collection point.

It is still another object of the present invention to provide a stapling operation which is automatically controlled by a series of in-line photoelectric cells and an attendant electronic circuit.

To briefly describe the apparatus and method of the present invention, there is provided a console having a horizontal feed table with a series of parallel feed tapes running longitudinally across the same which are adapted to carry successive groups of collated sheets from a collator of conventional construction into position for stapling into books. In accordance with one feature of the invention, a pair of stop pins are provided at the stapling station to engage the leading edges of the sheets to arrest the sheets whereby the frictional engagement with continuously moving feed tapes tends to bring the sheets into final alignment. Preferably the sheets are fed to this position while being in reversely shingled relationship, that is, in overlapping relationship with each forward sheet being positioned on top of each successive trailing sheet. With this arrangement, the collated sheets may be fed at a maximum speed because of the increased frictional surface area of the collated sheets which cooperate with the tapes. Furthermore, with this method, each successive lower sheet is automatically brought in turn into substantial alignment against the stop pins as the book is arrested. As final alignment is reached, the feed tapes begin to have increasing slippage under the sheets and an improved overhead jogger is brought into action to insure a rapid completion of the aligning operation.

Thus, in accordance with this important aspect of the improved machine of the present invention, the jogger is positioned above the feed table and operates in conjunction with the feed tapes for a particularly efficient alignment operation on the last few sheets of each book. In the preferred embodiment disclosed, the jogger includes a pivotal support arm for timed movement toward and away from the feed table. Mounted on the free end of said arm for pivotal movement is a depending pusher member that is adapted to frictionally engage the feed tapes at its lower end immediately behind the trailing edges of the last sheets of the book and positively carry these sheets forwardly to complete the jogging operation against the stop pins. In other words, the pivotal pusher member of the jogger insures that the trailing edges of all of the sheets are accurately aligned prior to the stapling operation.

Of particular importance to this feature of the invention is the fact that the pusher member employs no outside power to cause the same to move forwardly during the jogging operation in that it only need be lowered into frictional engagement with the tapes at the proper time. Furthermore, it will of course be realized that the jogger of this construction is particularly simple and capable of rapid operation and without causing undesirable buckling of the sheets due at least in part to the fact that its jogging function depends solely on the frictional engagement of the lower tips of the pivotal pusher member with the feed tapes, which results in a progressively decreasing force applied from the point of first engagement until final alignment is achieved, as will be seen later in detail.

The mechanism for operating the stapler means is also desirably simple and is designed to provide a simultaneous firm blow to a pair of staplers of conventional construction. Thus, a first operating cam is provided to actuate the staplers through a pair of floating plates resiliently connected and mounted for pivotal scissors-like action. The pivotal mounting of the plates is positioned at a substantial distance from the cams and the heads of the staplers so that a minimum amount of lost motion is encountered and manual operation is more nearly simulated. A second cam on the drive shaft with the stapler operating cam serves through a pivotal arm connection to drive the stop pins downwardly free of the feed table after the stapling operation has been completed. In this inoperative position they are held by linkage cooperating with an electromagnetic brake to allow the completed book to be delivered by the feed tapes to a final collection point.

Another feature of the invention is concerned with a novel transfer table also having feed tapes for delivering the reversely shingled sheets to the feed table. In particular, this transfer table is designed to be inclined at any selected angle upwardly from the feed table so that the input end may be positioned at any desired height to receive the sheets directly from the output of a collator. The feed tapes of both the transfer and feed tables are driven from a common source so that a continuous endless conveyor is provided by which the shingled sheets are fed in an efficient manner without interruption and without manual handling.

To summarily outline the operation of the machine in response to the photoelectric control circuit that forms another important part of the present invention, as each group of collated sheets approaches the stapling station on the continuously driven feed tapes, a first photocell is covered to cause the overhead jogger to be lifted from the feed table in readiness for performing the jogging function. As the next photocell is covered, the stop pins projecting across the feed path of the books are released and lifted into position to engage the leading edge of the books to stop the same at the stapling station. The third photocell is next covered as the book comes to rest against the stop pins to condition the stapler for operation. Then, as the trailing edge of the shingled group of sheets uncovers the first photocell, the jogger is released and is operative to perform its jogging function, that is of bringing the rear edges of the sheets into final alignment. When these trailing edges are aligned, the second photocell is uncovered at which time the stapler is operated and immediately thereafter the stop pins are driven down to release the completed book to the collection point. Thus, it can be seen that the stapler cycle operates entirely automatically and in such a manner as to assure the rapid formation of books in rapid succession. Furthermore, the books can be handled at a maximum rate from the collator to the feed table and through the stapling operation due to the straight line path followed. Also, since the tapes on the feed table are maintained in constant rotating mode, the finished booklet is quickly removed from the stapling station so that the next in-line book is ready to be received at the stapling station.

Still other objects and advantages of the present invention will become readily apparent to those skilled in this art from the following detailed description, wherein we have shown and described only the preferred embodiment of the invention, simply by way of illustration of the best mode contemplated by us of carrying out our invention. As will be realized, the invention is capable of other and different embodiments, and its several details are capable of modification in various obvious respects, all without departing from the invention. Accordingly, the drawings and description are to be regarded as illustrative in nature, and not as restrictive.

In the drawings:

FIGURE 1 is an overall perspective view of a preferred embodiment of the stapler console constructed in accordance with the principles of the present invention;

FIGURE 2 is a top view of the stapler machine showing the positioning of a stapled book at the stapling station and with certain cover parts broken away for clarity;

FIGURE 3 is a side view of the machine showing the positioning of the photoelectric cells and the jogger in relation to the groups of collated sheets;

FIGURE 4 is an enlarged detailed view of the receiving end of the inclined delivery table and the manner of adjustable connection with the feed rolls of a collator;

FIGURE 4a is a detailed view of the stapling station illustrating the aligning action performed on the shingled sheets as they are fed against the stop means;

FIGURE 5 is a view of the internal operating parts within the housing showing the stapler and stop pin operating mechanism;

FIGURE 5a is a detailed view illustrating the mechanism for actuating the stapler;

FIGURE 6 is a cross-sectional view taken along line 6—6 of FIGURE 5 showing the relationship of the operating cams and the floating stapler operator;

FIGURE 6a is a detailed view showing the stop pin driving cam and its floating operator;

FIGURE 7 is a block diagram of the photoelectric control circuit of the machine; and FIGURE 8 is a detailed diagram of the circuitry shown in FIGURE 7.

Referring now to FIGURES 1–3 of the drawings, the preferred embodiment of a stapling console or machine 10 is illustrated for the purpose of disclosing the pertinent features of the apparatus and method of the present invention. This console 10 defines a horizontal feed table 11 supported on a pedestal frame 11a and longitudinally along which are provided a plurality of feed tapes 12 designed to transport the collated material for the stapling operation. These feed tapes 12 are guided in their movement by a pair of conventional guide rollers 13, 14 at opposite ends of the feed table 11 with the guide roller 13 being driven in a suitable fashion by a sprocket 15 (FIGURE 2), which is in turn, driven by a chain drive 16 receiving power from a main drive shaft 17 positioned below the feed table 11, as best illustrated in FIGURE 3. The main drive shaft 17 receives its driving power through a second chain drive 18 from a suitable electric motor M and reduction gear unit U.

Positioned on one side of the feed table 11 is a stapler housing, designated by the reference numeral 20, having a rear portion 20a which is tiltable to the rear for convenient access to the staplers and the operating mechanism, which will be described in detail below. Opposite the stapler housing 20 is an adjustable side edge guide 21, which is designed to insure that the sheets being fed by the feed tapes 12 are urged into position under throat 22 of said housing 20 for receiving the staples, as will be more fully seen in detail later. When the stapling operation has been performed, the finished book is carried by the delivery end of the tapes 12 into a collection hopper 23 which is equipped with a stacking table 24 supported by parallelogram linkage 25 so that it can lower from the dotted line position to the full line position in the usual manner as the hopper 23 is filled. To insure that the books are delivered into the hopper 23 in an upright fashion without flipping over, a plurality of rider discs 26 may be provided on an idler shaft 27 supported at its ends by suitable brackets 28, 29.

As the groups of sheets are fed into the throat 22, a pair of stop pins 30, 31 are operative to arrest the sheets thereby defining a stapling station S and forming the book B, as shown in FIGURE 2. As stated above and as will be explained more fully in detail below, the action of the continuously driven tapes 12 is such as to substantially bring all of the sheets of the book B into alignment; however, to insure that the last few sheets are aligned and done so within the shortest possible time, there is provided an overhead jogger assembly, generally represented by the reference numeral 32. As can best be seen in FIGURE 3, this jogger assembly 32 includes a pivotal support arm 33 fixed to the transverse operating shaft 34 extending across the rear of the console on suitable support brackets 35, 36 (note FIGURE 2). An operating arm 37 projects inside the housing 20 for actuation by a solenoid 37a and cooperating spring 38 that causes the support arm 33 to be moved away from and toward the table 11, respectively, as indicated by the arrow $a_1$ in FIGURE 3. A support collar 39 is adjustably attached along the free end of the operating lever 33 by a set screw 33a and carries a depending pusher member 40 which, as shown in FIGURE 3, is adapted to freely pivot about the pin 41, as indicated by the arrow $a_2$. Thus, in the dotted line inoperative position in which the pusher member 40 is raised and normal to the horizontal feed table 11, the sheets being delivered to the stapling station S are free to move under said pusher member 40. Then upon the proper signal, that is in response to the sheets having passed this vertical position of said member 40, the support arm 33 is lowered by operation of the lever 37 by spring 38 (note FIGURE 5) such that spaced legs 43, 44 of the pusher member 40 drop onto the adjacent feed belts 12 (as shown in FIGURES 1 and 2) and due to the frictional engagement therewith are carried against the trailing edges of the final sheets in book B at the stapling station S.

It should be noted that lower tips or shoes 43a, 44a (FIGURE 1) of the legs 43, 44, respectively, are formed at a slight rearward angle to the same. This angle, as can be seen in FIGURE 3, advantageously causes the pusher member 40 to bite into the endless tapes 12 with considerable force as the same is initially brought to the lowered or operative position. As a result, the pusher member 40 is at first driven forwardly without slippage in an efficient manner so as to quickly overtake and engage the trailing edges of the sheets to initiate the jogging operation. However, as the pusher member 40 continues to move forwardly to the full line position, the frictional driving force between the shoes 43a, 44a and the tapes is progressively reduced due to the change in engagement angle from 90° to approximately 45° (note arrow $a_2$ in FIGURE 3). Also, it will be realized that as the pusher member 40 lowers upon this forward movement, the compression in the spring 38 becomes less thereby further reducing the driving force. The result of this is that while the pusher member 40 is quickly brought into operative position behind the sheets to be aligned, there is no tendency to buckle or bend the sheets at the stapling station S due to progressively reducing the jogging action. In other words, since no outside motive force is used to drive the pusher head 40 forward but merely the progressively decreasing frictional engagement between the shoes 43a, 44a and the tapes 12, there is little or no chance of exerting too much force on the small book B so as to cause the same to buckle along its length (see FIGURE 2) and thus an accurate stapling operation is assured in this respect.

If desired, limits of pivotal movement of the pusher member 40 may be imposed by suitable stops; however, this has not been found to be necessary for the successful operation. Also, it should be noted that the formation of the shoes 43a, 44a with a reverse angle affords a vertical alignment surface along their front face when said member 40 has moved to the full line or operative jogging position (see FIGURE 3).

Extending upwardly from the input end of the machine 10 is a transfer table 50 which is pivotally mounted about the drive shaft of the roller 13 by a pair of mounting extensions 51, 52 (see FIGURE 2). Suitably positioned for feed movement downwardly along the table 50 are a plurality of feed tapes 53 which cooperate with the driving roller 13 in alternate spaces with the feed tapes 12 and serve to carry groups of collated and reversely shingled sheets $G_1$–$G_3$ (see FIGURES 3 and 4) to the feed table 11. The free end or receiving end of the transfer table 50 (FIGURE 4) has an idler guide roller 54 about which the tapes 53 are trained.

Mounting brackets 55 suitably attach said conveyor 50 to a stud 56 on the frame of a delivery portion 57 of a conventional collating device (not illustrated). With this arrangement the machine 10 can be easily adapted to receive sheets from a wide range of input levels so that almost any make or model collator with shingled sheet delivery is suitable for use. This delivery portion 57 of one such collating device includes, for example, two in-line rotary feed couples, generally designated by the reference numerals 58, 59, between which are adapted to be fed a continuous line of sheets G (FIGURE 4). The feeding couples 58, 59 are preferably driven in an intermittent fashion by a suitable collator drive means 61 which is timed so as to divide the sheets G into the groups of sheets $G_1$–$G_3$ that thus represent individual books to be stapled. To insure and facilitate this feeding between the collator and the transfer conveyor 50, a curved shield 62 is provided around the end of the transfer table 50 to shield roller 54 and guide sheets onto the feed tapes 53. At least one large diameter rider disc 63 carried by pivot arms 64 (FIGURE 2) from cross shaft 65 is positioned to cooperate with the shingled sheets (note group $G_1$ in FIGURE 4) to insure that there is no excess bowing of the same as the turn is made onto the conveyor tapes 53 from the feed portion 57 of the collator.

Several advantages are attendant to feeding the sheets up to the stapling station S in a reversely shingled mode, as illustrated. First, it will be realized that the area of frictional engagement between the groups of sheets $G_1$–$G_3$ and the tapes 12, 53 is greatly increased by the overlapping arrangement of the same so that the tapes can be fed at maximum speed without fear of slippage. Also, the feeding of the groups of sheets $G_1$–$G_3$ in a shingled rather than an aligned arrangement eliminates the need for the prior art preliminary alignment step, as well as the need for keeping the sheets in alignment as they are transported.

As can be described by viewing FIGURE 4a, the shingling of the sheets in a reverse mode is of substantial importance in assuring proper alignment of the sheets against the stop pins 30, 31. In this figure there is shown a group of sheets $G_3$ and it can be seen that the top sheet $s_1$ is the first to engage the stop pins 30, 31 whereupon the sheets $s_2$, $s_3$, etc. follow in succession and are cleanly driven against the same to perform the aligning operation in an efficient manner. Of particular importance, is is fact that the sheets as they abut the stops 30, 31 and are aligned are also lifted away from the feed tapes 12 whereas the sheets remaining for alignment are still in driven contact with the feed tapes 12. As the stack of sheets grows, the lower sheets are acted upon by additional weight which increases the frictional resistance between the sheets and makes it more difficult for them to be brought into firm abutting engagement with the stop pins 30, 31; however, at this point, the pusher member 40 is dropped behind the last sheet and affords a positive engagement with the tapes 12 to push the trailing sheets underneath the upper sheets to form the final book B (FIGURE 3).

Referring now to FIGURES 5 and 6 of the drawings, there is shown in detail the operating mechanism for a pair of side-by-side staplers 80, 81 which may be of conventional construction, each having the usual drive head 82 at the front thereof and elongated body 84 pivoted about pivot 85 (see FIGURE 6). The staplers 80, 81 are bodily positioned within the housing 20 and within an arch-like framework that includes a pair of upstanding side members 86, 87, as shown in FIGURE 5. Rotatably supported between said side members 86, 87 are a rear drive shaft 88 and a front drive shaft 89 interconnected by a speed reducing belt drive arrangement 90. The rear shaft 88 is driven through a suitable belt 91 from a motor M' mounted below the feed table 11.

Mounted on the front shaft 89 is a one-revolution clutch 100 which can be of any conventional construction. This clutch transmits the power from the rear shaft 88 in such a manner that the front shaft 89 is driven intermittently through one complete revolution for each stapling cycle. In the embodiment shown, the clutch 100 is provided with a stop pin 101 which is held by a latch pawl 102 resiliently biased into holding position by the spring 103. To operate the clutch 100 to initiate the stapling operation, the pawl 102 is rotated about its pivot 104 by a solenoid 102a, as shown in FIGURE 5a, which allows the pin 101 to rotate through the path shown and whereby the shaft 89 turns through one complete counterclockwise revolution.

A first operating cam 110 is fixedly mounted on the front shaft 89 for operating the staplers 80, 81 in response to the intermittent rotation through a floating resilent actuator, generally represented by the reference numeral 111. Thus, there is provided a pair of movable plates 112, 113 which are pivoted for scissors-like action about a pivot pin 114 fixed adjacent the rear of the housing 20 (note FIGURE 6). As can be seen, these plates 112, 113 are spaced at their free ends by a pair of springs 115 whereby the scissors-like action between the plates is cushioned. The outwardly or spreading movement of the plates 112, 113 is preferably limited by U-shaped bracekts 116 carried by the upper plate 112 and free with respect to the lower plate 113. Mounted adjacent the center of the upper plate 112 is a cam follower 117 carried by suitable brackets 118. As a result of this construction, upon rotation of the shaft 89 and the cam 110, the driver 82 of the staplers 80, 81 is simultaneously driven downwardly with a firm blow cushioned by the actuator 111 in such a manner that the stapling operation is properly carried out. Because of the fact that the plates 112, 113 are of substantial length with their pivot pin 114 being mounted adjacent the rear of the housing 20, the lower plate 113 is operative to drive the driver heads of the staplers 80, 81 downwardly with a minimum amount of lost motion and sliding contact between the parts. Thus, this floating action arrangement is designed to be very similar to the action expected with manual operation of the staplers 80, 81 for which they are originally designed so that high stapling efficiency and dependable operation is realized with the machine 10 of the present invention.

Also mounted for rotation with the front shaft 89 is a second operating cam 120 positioned adjacent the side wall 87. As illustrated in FIGURES 5, 6 and 6a, this cam 120 is operative to drive push rod 121 supported in the sleeve 122 downwardly in order to rapidly lower the stop pins 30, 31 so as to quickly release the book held at the stapling station S. A pivotal operating lever 123 which is mounted for movement about bolt 124 interconnects the cam 120 and the cap 126 of the push rod 121. As shown in FIGURE 6a, the lever 123 may be provided with a plurality of weight reducing apertures 127 spaced along the length thereof to reduce the inertia of the same. This is of importance on this part as well as on the remainder of the linkage employed to control the stop pins 30, 31 to be described below, so that the cam 120 may be designed with the maximum acceleration whereby the pins 30, 31 are positively driven to the inoperative position free of the feed path to release the book B in the shortest possible time after the stapling operation. The push rod 121 itself is retained in the raised position by a suitable spring 125 that acts between the guideway 122 and the cap 126 at the upper end of said rod 121.

The stop pins 30, 31 are carried by individual pivot supports 130 and are secured therein by suitable set screws 131. The levers 130 are carried by pivot shaft 132, which is mounted in bearing blocks 133. Also carried by the pivot shaft 132 is a control arm 134 having an armature plate 135 fixed to the lower edge thereof and in opposed relationship to an electromagnetic brake 135a. This entire linkage system is biased in the counterclockwise direction by a suitable spring 137 so that the stop pins 30, 31 are normally held in the arresting position, shown in the full lines in FIGURE 5.

As the shaft 89 rotates through a cycle, the cam 110 is first operative to cause the staplers 80, 81 to be operated so as to staple the book B, as previously explained. As shown in FIGURE 6, the cam 120 is positioned so as to lag behind the cam 110 by about 90° so that it reaches the dotted line operative position of FIGURE 6a so as to cause the pins 30, 31 to be lowered and effect release of the book B immediately after the stapling operation.

As the front shaft 89 makes the one revolution in a relatively short time period, it has been found to be desirable to provide a friction brake 140 held in looped relationship around a drum 141 by a bracket 142 fixed to the wall 86. Also, to prevent the shaft 89 from chatter as a result of the rapid deceleration, a one-directional roller type clutch 143 mounted in the side wall 87 is provided to prevent retromovement of said shaft 89 upon termination of each stapling cycle. Another auxiliary feature concerns a staple exhaust warning light 145 conveniently mounted on the front of the housing 20 which is operated by a microswitch 146 in response to suitable staple supply followers 147. Also, an on-off switch 148 may be mounted in a convenient location, such as on the pedestal 11a, as illustrated in FIGURE 1.

ELECTRONIC CONTROL CIRCUITRY AND OPERATION

Now to consider the sequential operation of the machine 10, as shown in FIGURE 2 and with reference to the block diagram shown in FIGURE 7, the leading edge of the group of sheets $G_3$ can be considered to first cover photocell or photodiode 202 which is located under auxiliary housing 203 positioned on the right-hand side of the feed table 11. The covering of the photocell 202 causes jogger drive coil 236 of the solenoid 37a to be energized thereby lifting the jogger assembly 32 to the dotted line position. The leading edges of the sheets $G_3$ next cover photocell or photodiode 252 which causes the coil 266 of the electromagnetic brake 135a to release the armature plate 135 thereby allowing stop pins 30, 31 to be raised into operative position. Photocell or photodiode 268 is then covered and the sheets come to rest against stop pins 30, 31. The trailing edge of the sheets $G_3$ next uncover photocell 202 which causes jogger drive solenoid coil 236 to be deenergized and the jogger assembly 32 is allowed to drop into position to align the sheets as described above prior to the stapling operation. With this alignment completed, the trailing edge then uncovers photocell 252, which causes stapler solenoid 102a to be activated which in turn allows the shaft 89 to rotate to drive staples into the aligned sheets. Preferably an interlock is provided to prevent the stapler mechanism from being activated more than once in a cycle. The uncovering of photocell 252 also activates brake coil 266 in readiness to attract the armature plate 135 when the rod 121 is pushed down by the cam 120 at the end of the stapling cycle whereby the stop pins 30, 31 recede and remain in a recessed position until photocell 252 is again covered and jogger drive solenoid 37a is activated to raise the jogger assembly 32 thereby enabling a new group of sheets to be received by the apparatus.

The following is a description of the circuitry shown in FIGURE 7 which has been specifically designed for high speed, automatic operation for accomplishing the aforementioned mechanical functions of the machine 10 in the most expeditious manner. Photocell 202 in jogger drive circuit 200 is connected to signal amplifier 208 in such a manner that when photocell 202 is covered signal amplifier 208 is activated, and when photocell 202 is uncovered signal amplifier 208 is turned off. The activation of signal amplifier 208 changes the state of flip-flop 225 to provide an output signal at 221 which activates driver amplifier 239 to energize jogger drive solenoid coil 236 and raise jogger assembly 32 from the tapes 12.

Photologic circuit 250 essentially comprises photocells 252, 268, signal amplifiers 254a, 270a and AND gate 276. Photocell 252 is connected to signal amplifier 254a such that when photocell 252 is covered signal amplifier 254a is activated and deactivated when photocell 252 is uncovered. Stop pin solenoid coil 266 is energized by pin drive amplifier 262a which is in turn activated by signal amplifier 254a when photocell 252 is covered. The energization of stop pin solenoid coil 266 raises stop pins 30, 31 above the top of feed table 11 in position to block the passage of the sheets and to align the sheets on feed table 11 for stapling, as previously described. Signal amplifier 270a is activated when photocell 268 is uncovered and turned off when photocell 268 is covered. When photocell 268 is covered AND gate 276 is conditioned to provide a stapling signal to flip-flop 300a in stapler drive circuit 300. The uncovering of photocell 252 by the trailing edges of the sheets provides a trigger signal to flip-flop 300a via AND gate 276 which switches the flip-flop thereby rendering drive amplifier 335 conductive and energizing stapler release coil 334 of solenoid 102a enabling staples to be driven into the assembled forms. The switching of flop-flop 300a activates relaxation oscillator 336a to provide a delayed reset pulse via diode 347 to reset flip-flop 300a. The resetting of flip-flop 300a turns off driver amplifier 335 thereby deenergizing stapler release solenoid coil 334 and the output signal at 309 is inverted by inverter 238 and provided to flip-flop 225 in the jogger drive circuit 200 which causes driver amplifier 239 to be activated to energize jogger drive solenoid coil 236 to raise jogger assembly 32 from the stapled sheets.

With continuing reference to FIGURE 7, double staple interlock circuit 350 is provided to insure that stapler release solenoid coil 334 is activated only once during a stapling cycle such that no more than one staple is driven into the stacked sheets. Double staple interlock circuit 350 includes flip-flop 352 which is connected to relaxation oscillator 378. The output signal from AND gate 276, which energized stapler release solenoid coil 334 when photocell 252 was uncovered by the trailing edge of the asembled forms, also switches flip-flop 352 to provide a signal at 361 which activates relaxation oscillator 378. The output at 361 also activates amplifier 278 via line 282 to maintain drive amplifier 262a in a nonconductive state and thereby prevent AND gate 276 from being conditioned to provide another staple driving signal. The time constant of relaxation oscillator 378 is selected so as to enable the completion of the stapling operation before a reset pulse is provided to the input of flip-flop 352 via diode 376. The timed output pulse from relaxation oscillator 378 causes flip-flop 352 to change its state. The output at 361 is now such that amplifier 278 is turned off and signal amplifier 254a is conditioned to receive signals from photocell 252 enabling the next stapling cycle to begin.

A more detailed embodiment of the electronic circuitry necessary to perform the functions indicated in block diagram form in FIGURE 7 is shown in FIGURE 8. The numeral designation of the component elements provided in FIGURE 7 is the same in FIGURE 8 wherever possible to avoid confusion.

Power supply terminals 201, 201b are preferably at a D.C. potential of +24 volts and power supply terminal 201a is preferably at +12 volts.

Jogger drive circuit 200 comprises photocell element 202, signal amplifier 208, flip-flop 225, inverter 238 and driver amplifier 239. Photocell element 202 is connected to positive supply terminal 201 and to ground through potentiometer 203. Transistor 204 is connected at its base 206 via resistor 209 to the movable arm of potentiometer 203. Emitter 205 is connected to positive supply terminal 201a and collector 207 is connected to ground through resistor 210. The output from collector 207 is provided through capacitor 211. The resistance of photocell element 202 decreases when it is exposed to light. It therefore has a low resistance when exposed to light and a high resistance when covered. The arm of potentiometer 203 is adjusted to insure that transistor 204 is rendered conductive when photocell element 202 is covered and rendered nonconductive when photocell element 202 is uncovered. The covering or exclusion of light from photocell element 202 causes transistor 204 to turn on and thereby provide a positive signal at collector 207. Conversely, when photocell element 202 is uncovered transistor 204 is turned off and its change of state causes collector 207 to return to ground potential.

The output signals at collector 207 of transistor 204 are provided via capacitor 211 to base 220 of transistor 218 in flip-flop 225. Flip-flop 225 comprises transistors 212 and 218 which are connected in a well-known arrangement such that the conduction of one causes the nonconduction of the other. More specifically, emitters 213 and 219 are respectively connected to ground. Bases 214 and 220 are respectively connected to resistors 217 and 223. Collectors 215 and 221 are respectively connected to the opposite ends of resistors 217 and 223 to provide the necessary cross coupling to cause flip-flop 225 to operate in its well-known manner. Collector 215 is connected via resistor 216 to positive supply terminal 201 and collector 221 is also connected to positive supply terminal 201 via resistor 222. The output of flip-flop 225 is taken from collector 221. The application of positive pulses to base 220 causes transistor 218 to be conductive and transistor 212 to be nonconductive. Conversely, the application of negative pulses to base 220 renders transistor 218 nonconductive and transistor 212 conductive.

Driver amplifier 239 comprises transistors 226 and 232. Emitter 227 is connected to positive supply terminal 201a. Base 228 is connected to collector 221 by means of resistor 224. Collector 229 is connected to ground through resistor 230. The output signal from collector 229 is provided to base 234 of transistor 232 by means of resistor 231. Emitter 233 is grounded and collector 235 is connected to jogger solenoid coil 236. The other end of jogger solenoid coil 236 is connected to positive supply terminal 201b. Diode 237 is connected across jogger solenoid 236 to reduce the flyback voltage signal appearing across coil 236 when it is deenergized. Transistor 226 is rendered conductive by the output signal from collector 221 when base 220 is pulsed positive rendering transistor 218 conductive. The conduction of transistor 226 provides a positive signal to base 234 to thereby cause transistor 232 to conduct and energize jogger solenoid coil 236. In a converse manner transistors 226 and 232 are rendered nonconductive by the application of a negative pulse to base 220 which causes transistor 218 to be rendered nonconductive.

Inverter 238 essentially comprises transistor 240 having emitter 241 connected to positive supply terminal 201b via resistor 244 and to ground via capacitor 245. Base 242 is connected to the junction of bias resistors 247 and 248 by means of resistor 246. Collector 243 is connected to base 220 of transistor 218 in flip-flop 225 and to capacitor 211 in signal amplifier 208. A feedback signal from stapler drive circuit 300 is provided to the common junction of biasing resistors 247 and 248 by means of line 238a through coupling capacitor 249. Stapler drive circuit 300 is designed to produce a negative pulse at the junction of divider resistors 247 and 248 shortly after stapler release solenoid coil 334 is energized by the uncovering of photocell 252. This operation will be described in more detail hereinafter. Transistor 240 is biased in a nonconducting state by biasing resistors 247 and 248. The negative pulse causes transistor 240 to momentarily conduct, thereby applying a positive pulse to base 220 of transistor 218. Transistor 218 is rendered conductive and causes jogger solenoid coil 236 to be energized as explained above, to momentarily raise the jogger assembly 32 such that the next group of sheets may then be fed into the stapler station for the next cycle of operation.

Continuing with FIGURE 8, photocell 252 in photologic circuit 250 is connected from power supply terminal 201 to one end of potentiometer 253; the other end is grounded. Emitter 255 of transistor 254 is connected to power supply terminal 201a. Base 256 is connected to the movable arm of potentiometer 253 via resistor 258. The movable arm of potentiometer 253 is adjusted such that transistor 254 is on when photocell element 252 is covered and is off when photocell element 252 is uncovered. Collector electrode 257 of transistor 254 is connected to ground through resistor 260. Transistor 262, which serves to drive the pin solenoid coil 266, has emitter 263 connected to power supply terminal 201a. Base 264 is connected via resistor 261 to the common junction of collector 257 and resistor 260. Collector 265 is connected to one end of pin solenoid coil 266. The other end of pin solenoid coil 266 is grounded and diode 267 is connected across the coil to reduce the flyback voltage when coil 266 is deenergized. In operation, when photocell element 252 is covered by the leading edge of the sheets as they are transported along the delivery unit transistor 254 switches from an off condition to an on condition. This serves to raise the potential at base 264 to render transistor 262 nonconducting. Pin solenoid coil 266 is thereby inactivated and the pins are allowed to lift from their recessed position in the table 11.

Photocell 268 is connected between ground and power supply terminal 201 through potentiometer 269. Emitter 271 of transistor 270 is returned to power supply terminal 201a. Base 272 is connected to the movable arm of potentiometer 269 by means of resistor 274. The movable arm of potentiometer 269 is adjusted such that transistor 270 is nonconducting when photocell 268 is covered and conducting when photocell 268 is uncovered. Collector 273 is connected to ground by means of resistor 275. Diode 276 is connected by means of its anode to the common junction of collector 257 and resistor 260 and by its cathode to the common junction of collector 273 and resistor 275.

In operation, when the leading edge of the sheets covers photocell element 268, transistor 270 switches from an on to an off condition. Since photocell 252 is still covered by the sheets, transistor 254 is conducting and the anode of diode 276 is at a positive potential. Transistor 270 turns off, diode 276 conducts and charges capacitor 301 in staple drive circuit 300. The operation of staple drive circuit 300 will be described more fully hereinafter.

Transistor 278 serves to provide an interlock to prevent transistor 254 from inadvertently switching and thereby prevents more than one staple being driven into the assembled sheets. Emitter 279 of transistor 278 is connected to the base 256 of transistor 254. Base 280 is connected via line 282 to double staple interlock circuit 350 so as to receive a suitable signal to maintain transistor 278 conducting and provide potential at base 256 which is sufficient to temporarily maintain transistor 254 in a nonconducting state. The operation of this interlock circuit will be described more fully hereinafter.

Staple drive circuit 300 provides the necessary switching to activate the stapler release solenoid at the proper moment to staple the assembled sheets. As mentioned previously, a signal from stapler drive circuit 300 is provided via line 238a to inverter circuit 238 such that the driver drive is momentarily activated to raise the jogger after the staple has been driven into the assembled sheets.

Flip-flop 300a is connected to photologic circuit 250 by means of capacitor 301. More specifically, flip-flop circuit 300a comprises transistor 302 having emitter 303 connected directly to ground. Base 304 is connected to collector 309 of transistor 306 via resistor 310. Collector 305 is connected to power supply terminal 201 via resistor 316. Transistor 306 has emitter 307 connected directly to ground and base 308 connected to collector 305 of transistor 302 by means of resistor 312. Collector 309 is connected at the common junction of resistor 314 and 310 and is also connected to power supply terminal 201 by means of resistor 314. From the above description it is apparent that flip-flop 300a is connected in a manner known to those skilled in the art such that when transistor 302 is conducting transistor 306 is nonconducting and vice versa.

Transistor amplifier 320 has emitter 321 connected to power supply terminal 201a and base 322 connected by means of resistor 318 to the common junction of collector 305, resistor 312 and resistor 316. Collector 323 is connected to ground through resistor 324 and also to base 328 of transistor 326 by means of resistor 330. Transistor 326 serves to drive stapler release solenoid coil 334. Emitter 327 is tied directly to ground and collector 329 is connected to one end of stapler release solenoid coil 334. The other end of stapler release solenoid coil 334 is connected to power supply terminal 201b. Diode 332 is connected across the terminals of coil 334 so as to reduce the flyback voltage when transistor 326 switches from a conducting to a nonconducting state.

Relaxation oscillator 336a comprises uni-junction transistor 336 having emitter 337 connected to collector 309 of transistor 306 by means of resistor 340. Upper base 338 is connected to power supply terminal 201a via resistor 341. Lower base 339 is connected to ground by means of resistor 342. Capacitor 343 is connected between ground and the common junction of emitter 337 and resistor 340 to form a charging circuit having a suitable time constant for initiating conduction of uni-junction transistor 336. Relaxation oscillator 336a provides a reset pulse to flip-flop 300a by means of the pulse output from the lower base 339 of uni-junction transistor 336. The pulse from the lower base 339 is provided to base 308 of transistor 306 by means of the parallel combination of capacitor 345, resistor 346 and diode 347 as shown in FIGURE 8.

The operation of the stapler drive circuit 300 is as follows. As noted previously, the leading edge of the sheets first covered photocell 252 and then photocell 268. This sequence of events served to condition diode 276 such that capacitor 301 was charged. As the sheets proceed along the tapes 12 they come to rest against stop pins 30, 31 and at the same time photocell element 252 is uncovered. This causes transistor 254 to be rendered nonconductive thereby turning off diode 276. This enables capacitor 301 to discharge so as to cause transistor 306 to be turned off and transistor 302 to be turned on. The conduction of transistor 302 provides a suitable potential at base electrode 322 to render transistor 320 conductive. The conduction of transistor 320 initiates the conduction of transistor 326 to thereby energize stapler release solenoid coil 334 to provide the necessary staple to the assembled sheets. Simultaneously with the above action of the stapler release solenoid, the turning off of transistor 306 causes the potential at the common junction of collector electrode 309, resistors 310, 314 and 340 to rise to the potential of the power supply terminal 201a. Capacitor 343 begins to charge to this potential through resistor 340. When capacitor 343 reaches the firing potential of uni-junction transistor 336, a pulse is emitted from lower base electrode 339 and fed to base electrode 308 of transistor 306 in such a manner to cause transistor 306 to conduct. Flip-flop circuit 300a is therefore caused to change state such that transistor 306 is conducting and transistor 302 is nonconducting. The potential at the common junction of collector 309 and resistors 310, 314 and 340 drops, thereby charging capacitor 343 in the reverse direction through resistor 340. This negative signal is transmitted to inverter 238 via line 238a so as to cause transistor inverter 240 to conduct. The conduction of transistor 240 triggers flip-flop circuit 225 such that transistor 218 is rendered conductive and transistor 212 is rendered nonconductive. The conduction of transistor 218 causes transistor 226 to conduct which in turn initiates conduction of transistor 232 to provide an energizing current to jogger solenoid coil 236. Thus, after the staples have been driven into the assembled sheets, the jogger assembly 32 is caused to be raised by the pulse signal feedback from staple drive circuit 300.

Double staple interlock circuit 350 comprises flip-flop 352 and relaxation oscillator 378. Flip-flop 352 comprises transistors 354 and 358 which are cross connected in the well-known manner to provide a flip-flop circuit. Emitters 355 and 359 are connected to ground. Bases 356 and 360 are cross coupled to collectors 361 and 357 by means of resistors 363 and 362, respectively. Collector 357 is connected to power supply terminal 201 by means of resistor 364 and collector 361 is returned to the same terminal by means of resistor 365. The signal output from flip-flop 352 is taken from the collector electrode 361 and provided to base 280 of transistor 278 in photologic circuit 250 through resistor 366.

Relaxation oscillator 378 essentially comprises unijunction transistor 368 including emitter 369 which is connected to the junction of resistor 375 and capacitor 376, the latter forming a suitable charging circuit to initiate conduction of uni-junction transistor 368. Lower base 370 is connected to ground through resistor 371. The pulse output provided by uni-junction transistor 368 at lower base 370 is fed back to base 360 of transistor 358 in flip-flop 352 via capacitor 372 and diode 377. A connection to base 360 is also provided via line 286 through capacitor 285 to junction 284.

The operation of the double staple interlock circuit 350 is as follows. When the forms have come to rest against the stop pins and photocell 252 is uncovered, thereby initiating the discharge of capacitor 301 and the subsequent energization of stapler release solenoid coil 334, the pulse discharge of capacitor 301 is also transmitted to base electrode 360 of transistor 358 in flip-flop 352 so as to cause transistor 358 to be rendered nonconductive. The switching of flip-flop 352 causes the potential at the collector electrode 361 to rise to a positive potential. The connection between collector 361 and base 280 of transistor 278 in photologic circuit 250 via line 282 causes transistor 278 to be rendered conductive. The conduction of transistor 278 raises the potential at base 256 sufficiently positive so as to insure that transistor 254 remains nonconductive. The holding of transistor 254 in a nonconductive state insures that flip-flop 300a in stapler drive circuit 300 will not be subsequently inadvertently switched so as to initiate the activation of stapler release solenoid coil 334 a second time.

Simultaneously with the energization of transistor 278, the emitter 369 of uni-junction transistor 368 is raised to its firing potential by the charging of capacitor 376 through resistor 375. The pulse output at lower base 370 produced by the firing of uni-junction transistor 368 is transmitted to the base electrode 360 of transistor 358 to cause transistor 358 to be rendered conductive. The switching of flip-flop 352 causes the potential at collector electrode 361 to drop sufficiently such that transistor 278 is now rendered nonconductive. Photologic circuit 250 is thereby conditioned for another cycle of stapling operation. Resistor 375 and capacitor 376 are selected to provide a sufficiently long time constant to enable the apparatus to recycle in preparation for another stapling operation.

While the structure and operation of the control circuitry has been described with particular reference to light sensing means, such as photocells or photodiode elements, those skilled in the art will recognize that other sensing means may also be used with little or no modification to the basic control circuitry and without departing from the broader aspects of the invention. It is also to be understood that other and further modifications to the circuitry, as well as the mechanical features described in the first part of the application, may occur to those skilled in the art and can be employed without departing from the principles of the invention. The scope of the invention therefore should not be considered as limited to the embodiment and specific details set forth, but is properly to be determined by the appended claims.

We claim:

1. In a stapling machine wherein collated sheets are aligned and stapled together into a book, the combination of an endless feed conveyor, stop means for arresting the movement of said sheets at a stapling station, jogger means for aligning the trailing edges of said sheets by urging the same against said stop means, a stapler positioned along said conveyor at said stapling station for operation on said sheets to form said book, and control means responsive to the passage of said sheets to operate said stop means, said jogger and said stapler in proper sequence, said control means including a first photoelectric cell positioned a predetermined distance upstream of said stapling station, a second photoelectric cell in juxtaposition to the upstream limit of said stapling station, a third photoelectric cell positioned within the limits of said stapling station, and circuit means responsive to the actuation of said photoelectric cells whereby, covering of said first photoelectric cell by said sheets causes said jogger means to be activated, covering of said second photoelectric cell by said sheets causes said stop means to arrest the movement of said sheets at said stapling station, covering of said third photoelectric cell by said sheets conditions said stapler for operation, uncovering of said first photoelectric cell by the trailing edges of said sheets causes said jogger means to align the trailing edges of said sheets, and uncovering of said second photoelectric cell by the trailing edges of said sheets causes operation of said stapler and thereafter causes said stop means to release the completed book.

2. In a stapling machine wherein collated sheets are aligned and stapled together into a book, the combination of an endless feed conveyor, stop means for arresting the movement of said sheets at a stapling station, jogger means for aligning the trailing edges of said sheets by urging the same against said stop means, a stapler positioned along said conveyor at said stapling station for operation on said sheets to form said book, and control means responsive to the passage of said sheets to operate said stop means, said jogger and said stapler in proper sequence, said jogger means including a pivotal lever mounted above said conveyor for movement toward and away from the same, a depending pusher member pivotally mounted on the free end of said lever, and means for actuating said lever toward said conveyor in response to said control means so that the lower end of said pusher member engages said conveyor immediately behind each book so as to be carried forward against the trailing edges of said sheets to align the same against said stop means.

3. In a stapling machine wherein collated sheets are aligned and stapled together into a book, the combination of an endless feed conveyor, stop means for arresting the movement of said sheets at a stapling station, jogger means for aligning the trailing edges of said sheets by urging the same against said stop means, a stapler positioned along said conveyor at said stapling station for operation on said sheets to form said book, and control means responsive to the passage of said sheets to operate said stop means, said jogger and said stapler in proper sequence, first cam means for operating said stapler in response to said control means and second cam means fixed for rotation with said first cam means but lagging behind the same to drive said stop means to inoperative position to allow the stapled books to proceed from said stapling station for collection, a floating actuator positioned between said first cam means and said stapler, said actuator comprising a pair of opposed plates pivotally mounted at one end for scissors-like action, spring means positioned between the opposite end of said plates, whereby said stapler is provided with a firm blow through said spring to insure positive operation, said second cam means being designed for rapid acceleration, linkage means for supporting said stop means, a pivotal operating lever disposed between said second cam means and said linkage means, said linkage means and said operating lever being provided with a plurality of weight reducing apertures for allowing said second cam to be designed for maximum acceleration to allow said stop means to be driven to the inoperative position in the shortest possible time, and electromagnetic brake means energized by said control means in inoperative position when driven through said linkage means and said operating lever by second cam means.

4. In a stapling machine wherein collated sheets are aligned and stapled together into a book, the combination of an endless conveyor, stop means for arresting the movement of said sheets at a stapling station, jogger means for aligning the trailing edges of said sheets by urging the same against said stop means, a stapler positioned along said conveyor at said stapling station for operation on said sheets to form said book, control means responsive to the passage of said sheets to operate said stop means, said jogger and said stapler in proper sequence, a horizontal feed table, said feed conveyor including a plurality of parallel feed tapes having the upper operative run extending across said feed table, said stop means including a plurality of stop pins operative to extend through said feed table between said feed tapes for performing the arresting function and wherein said jogger means includes a pivotal lever mounted above said lever for movement toward and away from the same, means for actuating said lever toward said conveyor in response to said control means, a depending pusher member pivotally mounted on the free end of said lever, and a plurality of legs extending from the lower end of said pusher member so as to engage adjacent ones of said tapes immediately behind each book so as to be carried forward against the trailing edges of said sheets to align the same against said stop means.

5. The combination of claim 4 wherein said pusher member is mounted for free pivotal movement whereby said pusher member extends substantially normal to said feed table in the inoperative position and at an acute angle to the same in the operative position against said sheets after being formed into said book.

6. The combination of claim 5 wherein each of said legs is provided with a lower shoe portion formed at a slight rearward angle, whereby upon lowering said tip portion into engagement with said conveyor the same is operative to frictionally bite into said conveyor for rapid forward movement with the same during the first portion of movement but thereafter with progressively decreasing speed and frictional force to prevent buckling of said sheets in the final aligned condition.

7. The combination of claim 6 wherein said rearward angle at which said shoe portions are formed is such as to present a vertical face to the trailing edges of said sheets when positioned against the same at said stapling station.

8. A jogging apparatus wherein collated sheets are aligned while being transported, the combination of an endless feed conveyor, stop means for arresting the movement of said sheets at an aligning station, and a jogger assembly for frictionally engaging said feed conveyor behind the trailing edge of said sheets so as to be carried forward with said conveyor to urge the sheets into abutting relationship with said stop means for alignment.

9. The combination of claim 8 wherein said jogger assembly comprises a pivotal lever mounted above said conveyor for movement toward and away from the same, a depending pusher member pivotally mounted on the free end of said lever, and means for actuating said lever toward said conveyor to bring the lower edge of said pusher member into operative engagement with said conveyor to thereby perform the aligning operation.

10. The combination of claim 9 wherein said pusher member is mounted so as to extend substantially perpendicular to said conveyor in the inoperative raised position and said pusher member includes a lower tip portion formed at a slight rearward angle, whereby upon lowering said tip portion into engagement with said conveyor the same is operative to frictionally bite into said conveyor for rapid forward movement with the same during the first portion of movement but thereafter with progressively decreasing speed and frictional force to prevent buckling of said sheets in the final aligned condition.

11. The combination of claim 10 wherein said control means comprises a solenoid for lifting said lever to the inoperative position and spring means for bringing said pusher member to the operative position upon de-energizing said solenoid, said spring means acting in the direction to decrease in force as said pusher member moves forward so as to further decrease the speed and force of said pusher member.

12. In a stapling machine for stapling collated sheets, the combination of feed conveyor means, stop means for arresting the movement of the collated sheets at a stapling station, staper means positioned along the conveyor means a the stapling station, and sensor control means positioned along the conveyor means to provide control signals for operating the stop means and the stapler means, the sensor control means including first and second light responsive means, the first light responsive means controlling the stop means in an operative and inoperative position, the first and second light responsive means cooperating to control the activation of the stapler means.

13. The combination of claim 12 further comprising staple interlock means controlled by the first and second light responsive means to prevent the staple means from being reactivated for a predetermined period following a stapling operation.

14. The combination of claim 13 further comprising jogger means for aligning the collated sheets by urging the same against the stop means, and the sensor control means further including third light responsive means for controlling the jogger means.

15. The combination of claim 14 wherein the sensor control means further includes stapler drive means responsive to the first and second light responsive means for actuating the stapler means, the stapler drive means including controlled oscillator means for resetting the stapler drive means after a predetermined period following the activation of the stapler means, the stapler drive means also providing a signal to activate the jogger means subsequent to the resetting of the stapler drive means.

16. The combination of claim 15 wherein the staple interlock means includes controlled oscillator means for controlling the first light responsive means to prevent said means from being reactivated for a predetermined period following a stapling operation.

References Cited

UNITED STATES PATENTS

| | | | |
|---|---|---|---|
| 2,747,189 | 5/1956 | Fenimore | 270—53 |
| 3,055,009 | 9/1962 | March | 227—3 |
| 3,076,196 | 2/1963 | Mestre | 227—103 XR |
| 3,265,274 | 8/1966 | Burnell | 227—7 |
| 3,416,715 | 12/1968 | Fenimore | 227—3 XR |

GRANVILLE Y. CUSTER, JR., Primary Examiner

U.S. Cl. X.R.

227—7, 44 100: 270—53: 271—89